United States Patent Office 3,575,971
Patented Apr. 20, 1971

3,575,971
DIOXAZINE COMPOUNDS USEFUL AS STABILIZERS AND PIGMENTS IN PLASTIC MATERIALS
Raymond C. Harris, Gordon C. Newland, and James M. Straley, Kingsport, Tenn., assignors to Eastman Kodak Company, Rochester, N.Y.
No Drawing. Filed Feb. 28, 1968, Ser. No. 708,777
Int. Cl. C07d 99/02
U.S. Cl. 260—246
5 Claims

ABSTRACT OF THE DISCLOSURE

Compounds of the dioxazine series, useful as stabilizers and pigments for plastic materials, which have the following general structure

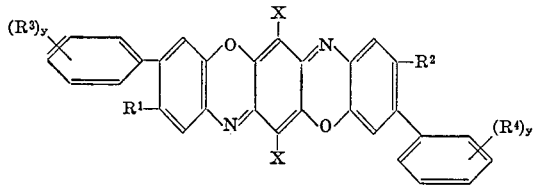

wherein X is halogen; $R^1$ and $R^2$ independently are hydrogent, $C_1$–$C_5$ alkyl, or $C_1$–$C_5$ alkoxy; $R^3$ and $R^4$ independently are hydrogen, halogen, hydroxy, $C_1$–$C_5$ alkyl or $C_1$–$C_5$ alkoxy; at least one of $R^1$ and $R^3$ and at least one of $R^2$ and $R^4$ being $C_1$–$C_5$ alkoxy; and y is 0–5.

This invention relates to new compounds of the dioxazine series which are useful as stabilizers and pigments in plastic materials.

These new compounds are defined by the general formula:

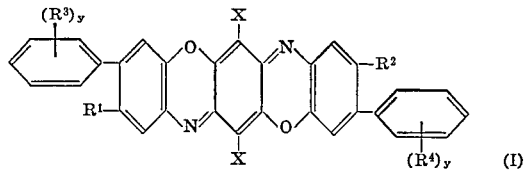

wherein:

each X is a halogen group, such as chlorine or bromine;
each $R^1$ and $R^2$ is independently hydrogen, an alkyl radical having 1–5 carbon atoms, or an alkoxy radical having 1–5 carbon atoms;
each $R^3$ and $R^4$ is independently hydrogen, halogen, a hydroxy radical, an alkyl radical having 1–5 carbon atoms, an alkoxy radical having 1–5 carbon atoms, or a

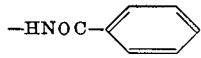

group;
at least one of $R^1$ and $R^3$ and at least one of $R^2$ and $R^4$ being alkoxy radicals having 1–5 carbon atoms; and
y is an integer of 0–5.

Within this general group are preferred compounds defined by the following sub-generic formula

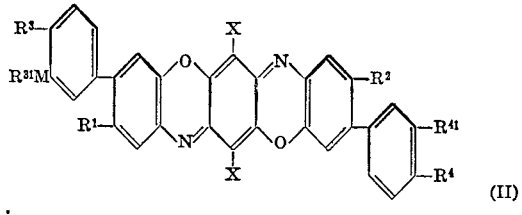

wherein:

each X is a halogen group as previously described;

each $R^1$ and $R^2$ is independently hydrogen or an alkoxy radical having 1–5 carbon atoms;
each $R^3$ and $R^4$ is independently hydrogen, an alkoxy radical having 1–5 carbon atoms, or a

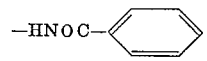

group;
and each $R^{31}$ and $R^{41}$ is independently hydrogen or an alkoxy radical having 1–5 carbon atoms;
at least one of $R^1$, $R^3$ and $R^{31}$ and at least one of $R^2$, $R^4$ and $R^{41}$ being alkoxy radicals having 1–5 carbon atoms.

The compounds described above may generally be prepared by condensing a 2,3,5,6-tetrahalo-1,4-benzoquinone, such as chloranil or bromanil, with a 4-amino-3-alkoxybiphenyl which has at least one other substituent in the para position on the other benzene ring of the biphenyl moiety. This condensation may be carried out at room temperature or at slightly elevated temperatures in an inert solvent, such as ethanol, and in the presence of an acid binding agent, such as sodium acetate.

The oxazine ring closure is carried out by treating the condensation product with non-sulfonating condensing agents such, for example, as Friedel-Crafts catalysts such as aluminum chloride or ferric chloride, and more especially aromatic acid chlorides, for example benzoyl chloride or naphthoyl chloride, benzotrichloride or benzene sulfonyl chloride. The reaction is advantageously conducted in a high boiling inert organic solvent, for example in nitrobenzene monodi- or trichloro-benzene, naphthalene or α-chloronaphthalene, at an elevated temperature, preferably above 150° C.

The following examples are included for a better understanding of the above-described preparation:

EXAMPLE 1

The following ingredients are slurried in 100 ml. of absolute ethanol and then stirred at ambient temperature for three hours:

3.9 grams 4-amino-2,4′,5-trimethoxy-biphenyl
0.7 gram chloranil
1.0 gram anhydrous sodium acetate The reaction mixture is then refluxed for about four and one-half hours, allowed to cool, and filtered. The solid condensation product is then thoroughly washed, first with water and then with ethanol, followed by drying at about 60° C. This product is a black powder which, when dissolved in sulfuric acid, has a bright blue-violet color.

The ring closure is performed by slurrying 1.8 grams of the condensation product in 18 ml. of dry nitrobenzene, adding 2 ml. of benzoyl chloride, and then heating the mixture to 190° C. over a period of about two hours followed by stirring for about seven hours at 190–200° C. The resulting mixture is allowed to cool. Thereafter, the solid product is filtered off and washed with alcohol and then water followed by drying at about 60° C.

The product, 6,13-dichloro-2,9-di-methoxy-3,10-bis(p-methoxyphenyl)triphendioxazine, had a chlorine content of 11.2% compared to a theoretical content of 11.3% and a nitrogen content of 4.2% compared to a theoretical content of 4.4%. The compound produces a bluish-green color dissolved in sulfuric acid and a bright bluish-red color dissolved in chloroform which also gives a brilliant red fluorescence in ultra-violet light.

EXAMPLE 2

The following ingredients are slurried in 300 ml. of absolute ethanol and heated to boiling:

36.6 grams dianisidine
8.2 grams anhydrous sodium acetate

To this boiling mixture is added a slurry of 11.3 grams of chloranil in 300 ml. of absolute ethanol. The addition is in small portions over a period of about two hours. The resulting mixture is stirred at reflux for about one and one-half hours after the addition and then filtered while hot. The precipitate is then thoroughly washed, first with water and then with alcohol. Following this, the precipitate is slurried in hot ethanol, filtered, washed with hot alcohol and dried at about 60° C.

To 15 grams of the precipitate formed above in 150 ml. of dry nitrobenzene is added 15 ml. of benzoyl chloride. The mixture is heated, with good agitation, to 200° C. over a period of about three and one-half hours. An additional 5 ml. of benzoyl chloride is then added and the reaction mixture is stirred at about 200° C. for about five and one-half hours. The mixture is then allowed to cool followed by filtering. The precipitate is washed with nitrobenzene, then with ethanol, and dried at about 60° C.

The product, 6,13-dichloro-3,10-bis(3-methoxy-4-benzamidophenyl)triphendioxazine, had a chlorine content of 8.5% compared to a theoretical content of 8.8% and a nitrogen content of 6.9% compared to a theoretical content of 6.9%. The compound produces a bright blue color when dissolved in sulfuric acid and gives a bright red fluorescence in chloroform solution under ultraviolet light.

As is apparent from the above examples the compounds of this invention possess good fluorescence properties. Some specific examples of these compounds are as follows:

6,13-dichloro-2,9-dimethoxy-3,10-bis(p-methoxyphenyl) triphendioxazine
6,13-dichloro-2,9-dibutoxy-3,10-bis(p-butoxyphenyl) triphendioxazine
6,13-dibromo-2,9-dimethoxy-3,10-(2-methyl-4-methoxyphenyl)triphendioxazine
6,13-dichloro-2,9-diethoxy-3,10-bis(p-ethoxyphenyl) triphendioxazine
6,13-dichloro-2,9-dimethoxy-3,10-bis(2,3,5,6-tetrachloro-4-methoxylphenyl)triphendioxazine
6,13-dichloro-2,9-dimethoxy-3,10-bis(2,4-dimethoxyphenyl)tripendioxazine
6,13-dichloro-3,10-bis(3-methoxy-4-benzamidophenyl) triphendioxazine
6,13-dichloro-3,10-bis(3-ethoxy-4-benzamidophenyl) triphendioxazine
6,13-dibromo-3,10-bis(3-methoxy-4-benzamidophenyl) triphendioxazine
6,13-dichloro-2,9-dimethoxy-3,10-bis(p-butylphenyl) triphendioxazine
6,13-dichloro-2,9-dimethoxy-3,10-bisphenyl triphendioxazine
6,13-dichloro-2,9-dimethoxy-3,10-bis(3-methylphenyl) triphendioxazine
6,13-dichloro-3,10-bis(p-methoxyphenyl)triphendioxazine
6,13-dichloro-3,10-bis(p-ethoxyphenyl)triphendioxazine Certain of the compounds of this invention are particularly advantageous from a preparation standpoint since they do not require the use of carcinogenic intermediates such as 4-aminobiphenyl as do some other compounds of the dioxazine series. In this regard, it is pointed out that those intermediates of the 4-amino-3-alkoxybiphenyl class do not exhibit the carcinogenicity as does 4-aminobiphenyl. As a result, certain of the compounds of this invention may be prepared without creating dangerous health conditions.

As indicated previously, the compounds of this invention are useful as stabilizers and pigments for plastic materials. In particular, these compounds exert a remarkable stabilizing effect to outdoor weathering, e.g. ultraviolet light, when incorporated into such plastics as cellulose esters, polyolefins, polyesters, and the like. Since the compounds also function as pigments they provide brilliant colors when dispersed in the plastics. Moreover, the compounds are extremely light-stable themselves and offer excellent light fastness properties. The compounds are also very compatible with the plastic materials and resist migration when incorporated therein. These compatibility and non-bleeding properties as well as the increased tinctorial properties would appear to be a result of the alkoxy groups present near each end of the molecule.

The compounds of this invention may be incorporated into the plastic materials by known techniques in any amount desirable for either stabilizing and/or pigmenting purposes.

It is also pointed out that other additives may be present in the plastic compositions or added thereto at the same time as the compounds of the invention. These additives may include other stabilizing agents, property improvers, fillers, antistatic agents, and the like.

The following examples serve to illustrate the stabilizing effects and lightfasteness properties of the present compounds when incorporated into various plastic materials.

EXAMPLE 3

A copolyester derived from 1 molecular equivalent of terephthalic acid, 0.7 molecular equivalent of 1,4-cyclohexanedimethanol and 0.3 molecular equivalent of 1,4-butanediol, and having an inherent viscosity of 0.89 is slurried in an acetone solution of the following additives, respectively. The resultant blends are dried and injection molded at 550° C. into tensile specimens 2.5 inches long by 0.5 inch wide by 1/16 inch thick and having a gauge section 1 x 0.25 inches.

The tensile specimens are exposed in an Atlas Weather-Ometer type XWR and the degradation due to weathering is measured by visual inspection and elongation measurement. The visual inspection involves periodic checking of the samples to determine the time at which the fluorescence of the sample begins to decline. The elongation measurement involves periodic withdrawal and elongating of samples. A plot is made of percent loss in elongation versus exposure time and the exposure time required for reaching a 50% loss in elongation is taken from the graph for comparison. The results of the tests are set forth in the following table:

TABLE 1

| Polyester plus the following additive— | Fluorescent lifetime, hours | Hours to 50% loss in initial elongation |
|---|---|---|
| None | 400 | 140 |
| 6,13-dichloro-2,9-dimethoxy-3,10-bis(p-methoxyphenyl)-triphendioxazine (0.25%) | >8,000 | 230 |
| 6,13-dichloro-3,10-bis(4-benzamido-3-methoxyphenyl)triphendioxazine (0.25%) | >3,000 | 180 |

The inherent viscosity of the polyester is determined at room temperature in a 60:40 mixture of phenol and tetrachlorethane.

The results given above show that the compounds of this invention are extremely light-stable since they continue to be fluorescent without signs of diminishing for considerable periods of time. Moreover, it may be seen that the life of the polyester is considerably lengthened with the addition of the compounds of this invention.

EXAMPLE 4

The compounds to be tested are mixed with cellulose acetate butyrate (13% acetyl, 38% butyryl) and plasticizer by hot roll compounding. The front and rear roll being maintained at 270° F. and 230° F., respectively. The ratio of additives are: 100 parts cellulose acetate butyrate:12 parts dibutyl-sebacate (plasticizer):1 part stabilizer when present. The material from the rolls is cut into ribbons and injection molded at 425° F. and 500 p.s.i. into specimens 0.5 x 2.5 x 1/16-in. thick. These specimens are exposed to ultraviolet radiation in an Atlas Sunshine Arc Weather-Ometer, type XWR. Samples are given increasing intervals of exposure in the weathering device after which flexural strength measurements are made in accordance with the Tour-Marshall procedure (ASTM–D747–43). The results of these weathering tests are summarized in the accompanying table.

TABLE II

| Cellulose acetate butyrate and plasticizer and the following additive— | Weather-Ometer exposure, hours [1] |
|---|---|
| None | 210 |
| Phenyl salicylate | 2200 |
| Polaris Red Pigment (Sherwin Williams CP 1285) | 530 |
| 6,13-dichloro-2,9-dimethoxy - 3,10 - bis(p-methoxyphenyl)triphendioxazine | >3000 |
| 6,13 - dichloro -3,10 - bis(3-methoxy-4-benzolamidophenyl)-triphendioxazine | >3000 |

[1] Required for 25% loss in flexural strength.

As shown in the table plastics containing the triphenodioxazine pigments are vastly superior to unstabilized plastic in resistance to loss of flexural strength during weathering. Comparisons of the stability of the triphenodioxazine stabilized compositions with compositions containing a commercial ultraviolet stabilizer, phenyl salicylate, and a commercial pigment, Polaris Red, indicates that the triphenodioxazines are outstanding in their ability to color the plastic and to protect it from degradation by weathering.

Thus having described the invention in detail, it is to be understood that variations and modifications may be made without departing from the spirit and scope of the invention as defined herein and in the appended claims.

We claim:
1. A compound having the following general formula:

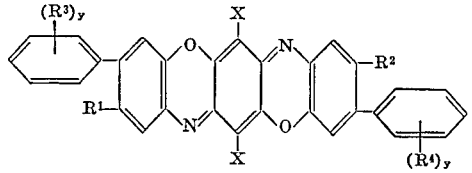

wherein each X is a halogen group;
each $R^1$ and $R^2$ is independently hydrogen, an alkyl radical having 1–5 carbon atoms, or an alkoxy radical having 1–5 carbon atoms;
each $R^3$ and $R^4$ is independently hydrogen, halogen, a hydroxy radical, an alkyl radical having 1–5 carbon atoms, or an alkoxy radical having 1–5 carbon atoms
at least one of $R^1$ and $R^3$ and at least one of $R^2$ and $R^4$ being alkoxy radicals having 1–5 carbon atoms; and $y$ is an integer of 0–5.

2. A compound having the following general formula:

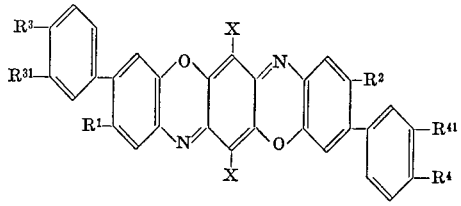

wherein each X is a halogen group;
each $R^1$ and $R^2$ is independently hydrogen or an alkoxy radical having 1–5 carbon atoms;
each $R^3$ and $R^4$ is independently hydrogen, or an alkoxy radical having 1–5 carbon atoms;
and each $R^{31}$ and $R^{41}$ is independently hydrogen or an alkoxy radical having 1–5 carbon atoms;
at least one of $R^1$, $R^3$ and $R^{31}$ and at least one of $R^2$, $R^4$ and $R^{41}$ being alkoxy radicals having 1–5 carbon atoms.

3. 6,13 - dichloro-2,9-dimethoxy - 3,10 - bis(p-methoxyphenyl)triphendioxazine.

4. 6,13 - dichloro - 3,10 - bis(p-methoxyphenyl)triphendioxazine.

5. 6,13 - dichloro - 3,10 - bis(p-ethoxyphenyl)triphendioxazine.

References Cited
UNITED STATES PATENTS
2,600,690   6/1952   Robbins _____ 260—246

ALEX MAZEL, Primary Examiner
A. M. T. TIGHE, Assistant Examiner

U.S. Cl. X.R.
260—40, 75, 76

PO-1050
(5/69)

UNITED STATES PATENT OFFICE
CERTIFICATE OF CORRECTION

Patent No. __3,575,971__ Dated __April 20, 1971__

Inventor(s) __Raymond C. Harris, Gordon C. Newland and James M. Straley__

It is certified that error appears in the above-identified patent and that said Letters Pa are hereby corrected as shown below:

Column 1, in the Abstract of the Disclosure, the formula should read:

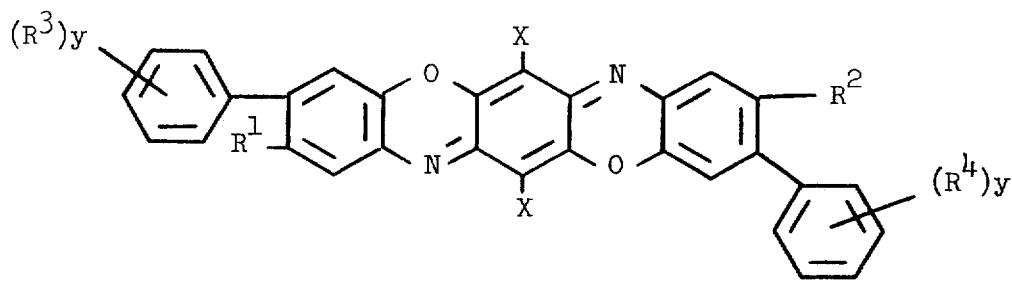

Column 1, lines 24 and 25, "hydrogent" should read ---hydrogen---.
Column 1, lines 62 to 70, formula (II) should read as follows:

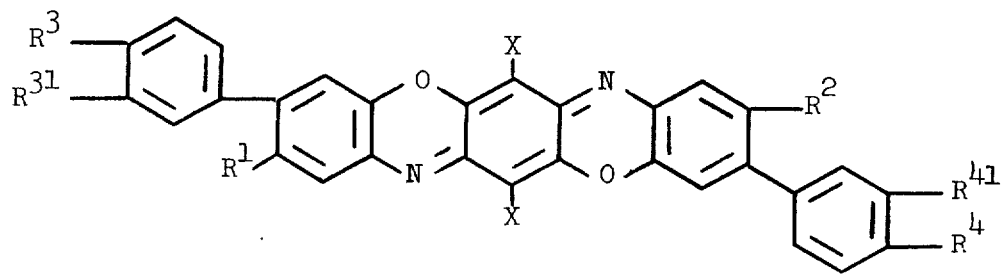

Column 3, lines 42 and 43, delete "6,13-dichloro-2,9-dimethoxy-3,10-bis(2,4-dimethoxyphenyl)tripendioxazine" and insert in place thereof ---6,13-dichloro-2,9-dimethoxy-3,10-bis(2,4-dimethoxyphenyl)triphendioxazine---.

Signed and sealed this 24th day of August 1971.

(SEAL)
Attest:

EDWARD M. FLETCHER, JR.
Attesting Officer

WILLIAM E. SCHUYLER, JR.
Commissioner of Patents